United States Patent
Sudhakar (10) Patent No.: US 9,870,225 B2
(45) Date of Patent: Jan. 16, 2018

(54) PROCESSOR WITH VIRTUALIZED INSTRUCTION SET ARCHITECTURE AND METHODS

(71) Applicant: Imagination Technologies Limited, Kings Langley (GB)

(72) Inventor: Ranganathan Sudhakar, Santa Clara, CA (US)

(73) Assignee: MIPS Tech, LLC, Santa Clara, CA (US)

( * ) Notice: Subject to any disclaimer, the term of this patent is extended or adjusted under 35 U.S.C. 154(b) by 227 days.

(21) Appl. No.: 14/572,186

(22) Filed: Dec. 16, 2014

(65) Prior Publication Data

US 2015/0178076 A1    Jun. 25, 2015

Related U.S. Application Data (60) Provisional application No. 61/919,698, filed on Dec. 20, 2013.

(51) Int. Cl.
*G06F 9/30* (2006.01)

(52) U.S. Cl.
CPC ........ *G06F 9/3016* (2013.01); *G06F 9/30098* (2013.01); *G06F 9/30145* (2013.01); *G06F 9/30181* (2013.01)

(58) Field of Classification Search
None
See application file for complete search history.

(56) References Cited

U.S. PATENT DOCUMENTS

| | | | |
|---|---|---|---|
| 5,167,026 A | * | 11/1992 | Murray ............... G06F 9/30149 712/210 |
| 5,440,701 A | | 8/1995 | Matsuzaki et al. |
| 6,351,806 B1 | | 2/2002 | Wland |

OTHER PUBLICATIONS

Baker G L et al. "Instruction execution conditioned on operand addresses", IBM Technical Disclosure Bulletin, Jan. 1982.

* cited by examiner

*Primary Examiner* — Corey S Faherty
(74) *Attorney, Agent, or Firm* — Vorys, Sater, Seymour and Pease LLP; Vincent M DeLuca

(57) ABSTRACT

A processor comprises a decoder for decoding an instruction based both on an explicit opcode identifier and on metadata encoded in the instruction. For example, a relative order of source register names may be used to decode the instruction. As an example, an instruction set may have a Branch Equal (BEQ) specifying two registers (r1 and r2) that store values that are compared for equality. An instruction set can provide a single opcode identifier for BEQ and a processor can determine whether to decode a particular instance of that opcode identifier as BEQ or another instruction, in dependence on an order of appearance of the source registers in that instance. For example, the BEQ opcode can be interpreted as a branch not equal, if a higher numbered register appears before a lower numbered register. Additional forms of metadata can include interpreting a constant included in an instruction, as well as determining equality of source registers, among other forms of metadata.

22 Claims, 10 Drawing Sheets

Instruction Stream to Instruction Queue 255

FIG. 9

BEQ Ra, Rb, Constant A

BNE Ra, Rb, Constant B 260

PROCESSOR WITH VIRTUALIZED INSTRUCTION SET ARCHITECTURE AND METHODS

CROSS REFERENCE TO RELATED APPLICATIONS

This application claims priority from U.S. Provisional Pat. App. No. 61/919,698, filed on Dec. 20, 2013, which is incorporated by reference for all purposes herein.

BACKGROUND

Field

In one aspect, the following relates to microprocessor architecture, and in one more particular aspect, to approaches to encoding instructions in machine code to be decoded within a microprocessor.

Related Art

An architecture of a microprocessor pertains to a set of instructions that can be handled by the microprocessor, and what these instructions cause the microprocessor to do. Architectures of microprocessors can be categorized according to a variety of characteristics. One major characteristic is whether the instruction set is considered "complex" or of "reduced complexity". Traditionally, the terms Complex Instruction Set Computer (CISC) and Reduced Instruction Set Computer (RISC) respectively were used to refer to such architectures. Now, some modern processor architectures have characteristics that were traditionally associated with only CISC or RISC architectures. In practicality, a major distinction of meaning between RISC and CISC architecture is whether arithmetic instructions perform memory operations.

A RISC instruction set may require that all instructions be exactly the same number of bits (e.g., 32 bits). Also, these bits may be required to be allocated accordingly to a limited set of formats. For example, all operation codes of each instruction may be required to be the same number of bits (e.g., 6). This implies that up to 2^6 (64) unique instructions could be provided in such an architecture. In some cases, a main operation code may specify a type of instruction, and some number of bits may be used as a function identifier, which distinguishes between different variants of such instruction (e.g., all addition instructions may have the same 6-digit main operation code identifier, but each different type of add instruction, such as an add that ignores overflow and an add that traps on overflow).

Remaining bits (aside from the "operation code" bits) can be allocated according to identifying source operands, a destination of a result, or constants to be used during execution of the operation identified by the "operation code" bits). For example, an arithmetic operation may use 6 bits for an operation code, another 6 bits for a function code (individual and collectively, as relevant from context, the "operation code" bits), and then identify one destination and two source registers using 5 bits each. Even though a RISC architecture may require that all instructions be the same length and use the same storage (e.g., 32 bits), not every instruction may require all bits to be populated.

SUMMARY

DETAILED DESCRIPTION

The following disclosure uses examples principally pertaining to a RISC instruction set, and more particularly, to aspects of a MIPS processor architecture. Using such examples does not restrict the applicability of the disclosure to other processor architectures, and implementations thereof.

As introduced above, each instruction supported by a processor architecture has a portion of bits available to identify the exact operation to be performed for a given instruction. This number of bits is limited by a variety of practical considerations. One consideration is instruction length; a 32 bit instruction requires less storage than a 64 bit instruction. A number of bits required to identify source and destination registers depends on a number of architectural registers to be supported, which may affect how many bits are left for other purposes. A complexity of logic required to decode instructions also may be a factor; for example, a selection of which operation codes identify which instructions can influence complexity and overall efficiency of decode logic.

Aside from the technical concerns, processor architecture design also is influenced by other considerations. One main consideration is support for prior generations of a given processor architecture. Requiring code to be recompiled for a new generation of an existing processor architecture can hinder customer adoption and requires more supporting infrastructure than a processor architecture that maintains backwards compatibility. In order to maintain backwards compatibility, the new processor architecture should execute the same operations for a given object code as the prior generation. This implies that the existing operation codes (i.e., the operation codes and other functional switches or modifiers) should be unchanged in the new processor architecture. This disclosure does not address the potential to emulate certain instructions, as while emulation is possible, it does not afford comparable execution speed to native execution. As computation needs change over time, it may be desirable to add instructions to support certain capabilities; for example, integer and floating point Single Instruction Multiple Data (SIMD) instructions. A technique that can allow more instructions to be expressed within an existing instruction set architecture while maintaining backwards compatibility is useful. A new processor architecture also may implement aspects of the disclosure.

Applicants have recognized that some instructions define operations that can be exploited to create metadata that can be used by a decoder unit in a processor to decode a single operation code into multiple distinct operations. One characteristic of some operations is that source operands are commutative, meaning that regardless which order two or more source operands are presented, a result of the operation is the same. For example, a Branch if Equal (BEQ) instruction may read a first source register and a second source register, and if values in these registers are equal, then the branch is taken; otherwise, the branch is not taken. A typical assembler or compiler may select two registers to store the values to be compared, based on a variety of considerations. This disclosure presents an example where a relative ordering of the registers used as the source operands is restricted in order to represent multiple different instructions with the same opcode identifier, and some potential restrictions. For example, to represent one instruction, it can be required that a first-appearing source register be a higher number than a second appearing source register; e.g., a first source register can be Register 3 and a second source Register can be Register 5 (i.e., these are numerals or references to the registers, not the values in the registers. To represent another instruction with the same opcode identifier, it can be required to have the first-appearing register be the higher register (Register 5 in the above example). In such fashion, a second instruction can be represented within opcode space that had been able to represent only a single instruction. Thus, in one example, the first instruction would be expressed by binary data that is the same as binary data for the second instruction, except that some of the binary data is in a different relative order or position between the first and second instructions. In this example, both the first instruction and the second instruction would be selected from among instructions that execute invariantly to an order of appearance of the operands or other data used to define them. Some implementations may also be able to address this issue of operand order with a compiler that handles variance of outcome that would occur based on different relative operand order.

Figures 1A, 1B:
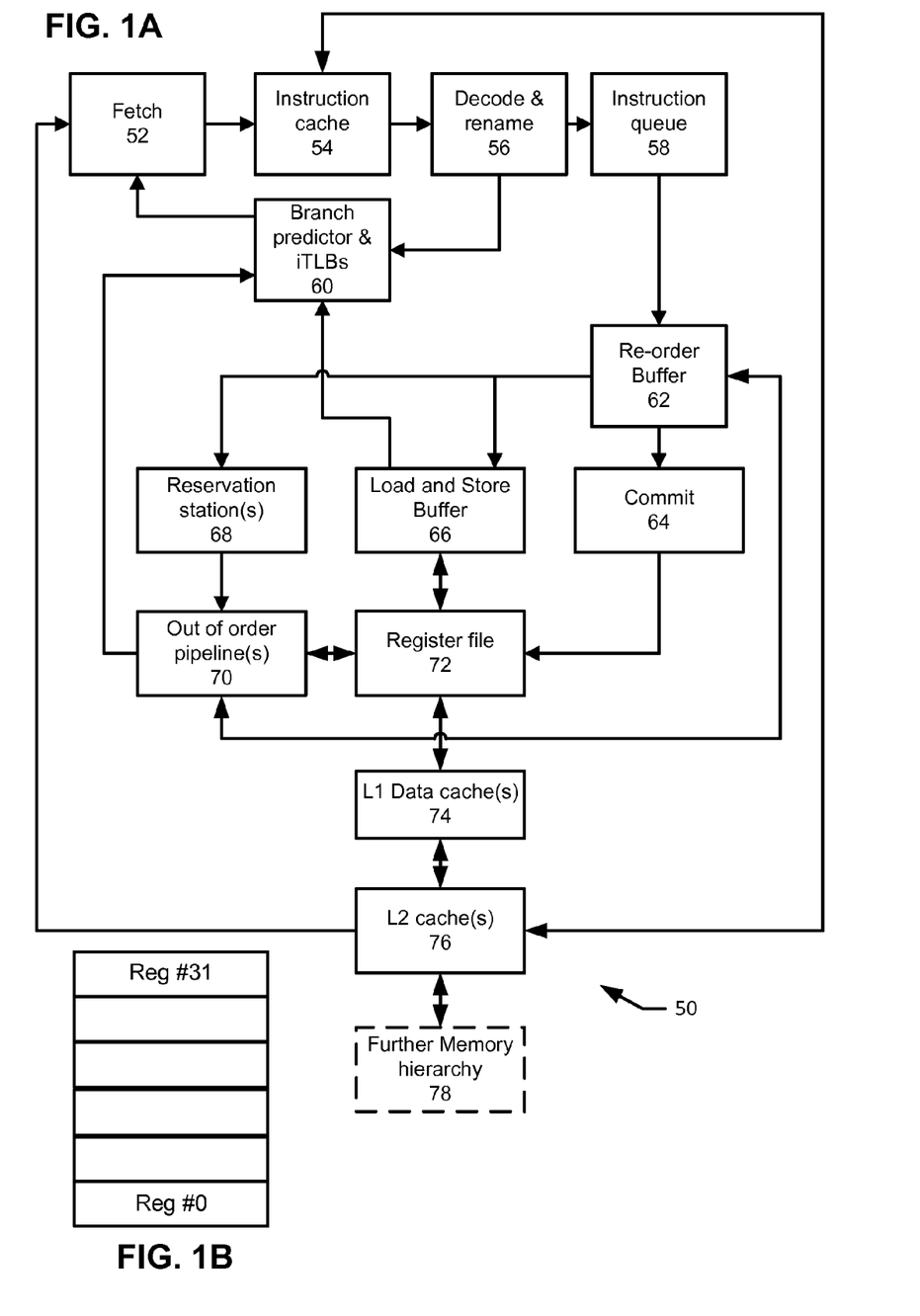
FIGS. 1A and 1B depict block diagrams pertaining to an example processor which can implement aspects of the disclosure.

FIG. 1A depicts an example diagram of functional elements of a processor 50 that can implement aspects of the disclosure. The example elements of processor 50 will be introduced first, and then addressed in more detail, as appropriate. This example is of a processor that is capable of out of order execution; however, disclosed aspects can be used in an in-order processor implementation. As such, FIG. 1A depicts functional elements of a microarchitectural implementation of the disclosure, but other implementations are possible. Also, different processor architectures can implement aspects of the disclosure. The names given to some of the functional elements depicted in FIG. 1A may be different among existing processor architectures, but those of ordinary skill would understand from this disclosure how to implement the disclosure on different processor architectures, including those architectures based on pre-existing architectures and even on a completely new architecture.

Processor 50 includes a fetch unit 52, that is coupled with an instruction cache 54. Instruction cache 54 is coupled with a decode and rename unit 56. Decode and rename unit 56 is coupled with an instruction queue 58 and also with a branch predictor that includes an instruction Translation Lookaside Buffer (iTLB) 60. Instruction queue 58 is coupled with a ReOrder Buffer (ROB) 62 which is coupled with a commit unit 64. ROB 62 is coupled with reservation station(s) 68 and a Load/Store Buffer (LSB) 66. Reservation station(s) 68 are coupled with Out of Order (OO) execution pipeline(s) 70. Execution pipeline(s) 70 and LSB 66 each couple with a register file 72. Register file 72 couples with an L1 data cache(s) 74. L1 cache(s) 74 couple with L2 cache(s) 76. Processor 50 may also have access to further memory hierarchy elements 78. Fetch unit 52 obtains instructions from a memory (e.g., L2 cache 76, which can be a unified cache for data and instructions). Fetch unit 52 can receive directives from branch predictor 60 as to which instructions should be fetched.

Functional elements of processor 50 depicted in FIG. 1A may be sized and arranged differently in different implementations. For example, instruction fetch 52 may fetch 1, 2, 4, 8 or more instructions at a time. Decode and rename 56 may support different numbers of rename registers and queue 58 may support different maximum numbers of entries among implementations. ROB 62 may support different sizes of instruction windows, while reservation station(s) 68 may be able to hold different numbers of instructions waiting for operands and similarly LSB 66 may be able to support different numbers of outstanding reads and writes. Instruction cache 54 may employ different cache replacement algorithms and may employ multiple algorithms simultaneously, for different parts of the cache 54. Defining the capabilities of different microarchitecture elements involve a variety of tradeoffs beyond the scope of the present disclosure.

Implementations of processor 50 may be single threaded or support multiple threads. Implementations also may have Single Instruction Multiple Data (SIMD) execution units. Execution units may support integer operations, floating point operations or both. Additional functional units can be provided for different purposes. For example, encryption offload engines may be provided. FIG. 1A is provided to give context for aspects of the disclosure that follow and not by way of exclusion of any such additional functional elements.

Some portion or all of the elements of processor 50 may be located on a single semiconductor die. In some cases, memory hierarchy elements 78 may be located on another die, which is fabricated using a semiconductor process designed more specifically for the memory technology being used (e.g., DRAM). In some cases, some portion of DRAM may be located on the same die as the other elements and other portions on another die. This is a non-exhaustive enumeration of examples of design choices that can be made for a particular implementation of processor 50.

FIG. 1B depicts that register file 72 of processor 50 may include 32 registers. Each register may be identified by a binary code associated with that register. In a simple example, 00000b identifies Register 0, 11111b identifies Register 31, and registers in between are numbered accordingly. Processor 50 performs computation according to specific configuration information provided by a stream of instructions. These instructions are in a format specified by the architecture of the processor. An instruction may specify one or more source registers, and one or more destination registers for a given operation. The binary codes for the registers are used within the instructions to identify different registers. The registers that can be identified by instructions can be known as "architectural registers", which present a large portion, but not necessarily all, of the state of the machine available to executing code. Implementations of a particular processor architecture may support a larger number of physical registers. Having a larger number of physical registers allows speculative execution of instructions that refer to the same architectural registers. Encoding instructions using metadata in the instruction, such as a relative order of source registers raises another criterion that a compiler would need to observe during generation of code to be executed (i.e. this approach to encoding instructions is a restriction on what architectural registers might be named in a given instruction). This restriction might lead to more instructions identifying the same architectural registers within a given portion of code. However, this criterion is not particularly bothersome, because false dependencies can be handled by register renaming during execution.

Figure 2:
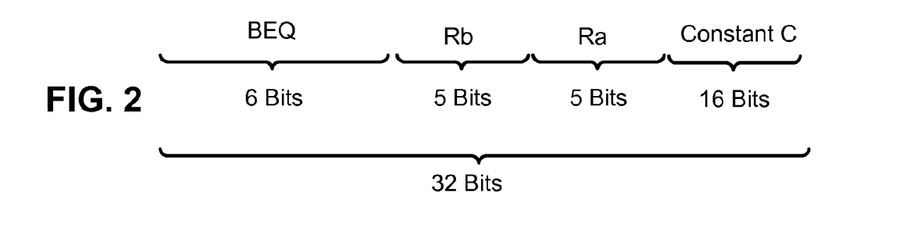
FIG. 2 depicts an example instruction encoding.

FIG. 2 depicts an example of an instruction that could be used to configure processor 50. The instruction is a Branch if Equal (BEQ). The example uses a total of 32 bits to define the instruction. A 6-bit identifier portion indicates the main opcode. The BEQ instruction requires two source registers (Ra and Rb). Each of Ra and Rb are identified by a 5-bit code. A remaining 16 bits of the 32 bits are allocated to a Constant (C), which is used to produce a branch target, from which processor 50 should begin execution if the values in Ra and Rb are equal. For convenience, a value in a particular register (e.g., Ra) is denoted by a preceding $ (e.g., $Ra identifies a value in Register Ra, and this specifically distinguishes the value in Register Ra from the number or identifier of Register Ra). For example, Register 5 may contain value 100. Register 5 may be identified as an operand source in an instruction (e.g., Ra=5), and if so, then $Ra=100). Other instructions may have different formats. In some cases, an instruction may specify a category of operations using the 6-bit main operation code identifier, and then include a function code field that specifies the specific operation to be performed. For example, all addition operations may be identified by the same 6-bit main operation code identifier, but the function codes will vary. For example, one addition operation may trap on overflow while another addition does not. These can be identified using different function codes. In this disclosure, these different fields are individually and collectively referred to as an "operation code identifier" (opcode identifier), and this term thus refers to the main opcode identifier alone, or with a corresponding function code, as would be appropriate in the particular context.

Figure 8:
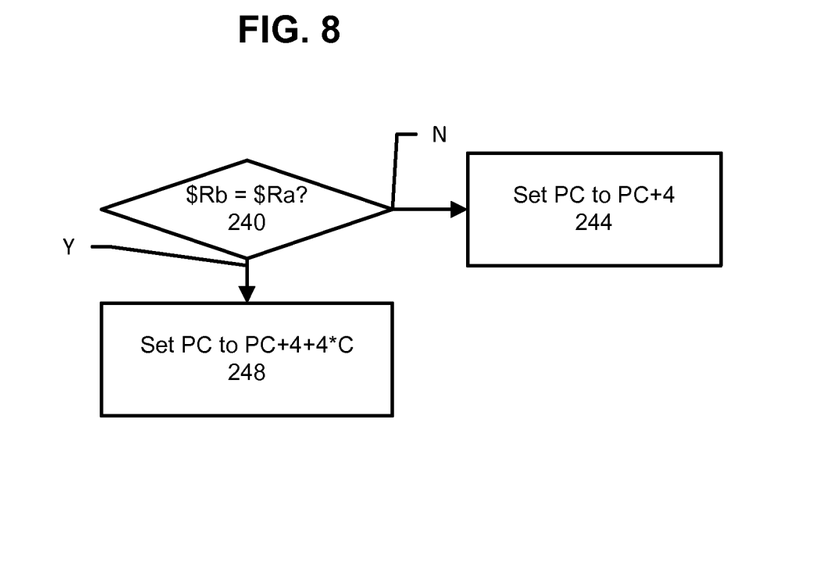
FIG. 8 depicts an interpretation of a Branch if Equal (BEQ) instruction.

FIG. 8 depicts canonical behavior of processor 50 when executing a BEQ. At 240, if a value stored in Ra ($Ra) is not equal to a value stored in Rb ($Rb) then the branch is not taken, and the Program Counter (PC) is incremented to a next instruction (e.g., by incrementing the PC by 4). Otherwise, the PC is set based on the Constant C, such as to PC+(4*(C+1)). Those of ordinary skill would appreciate that specific processors may set the PC differently, but the point is that the branch is taken or not taken, solely in dependence on whether $Ra=$Rb. As such, the BEQ instruction is an instruction that is indifferent to an order in which the operands are presented in the instruction. For example, if Register 5 holds a value of one source operand and Register 10 holds a value of the other source operand, then the BEQ instruction would behave the same, regardless whether Ra was set to 5 or 10, and vice versa, with respect to Rb. The example of the BEQ instruction is an example of an instruction that has source operands that are commutative. Other examples are addition and multiplication instructions (e.g., A+B=B+A). The example of logical equivalency of two or more instructions through the property of operand commutativity is used as a motivational example in this disclosure. However, other properties allow a conclusion to be reached that two or more instructions are logically equivalent. The following disclosure can be applied to two or more instructions that have been determined to be logically equivalent, either in the general sense, or under specified conditions.

Applicant has recognized that there are a subset of operations that are performed by a processor that are logically equivalent, but these operations are encoded with instructions that are different. Applicants thus has appreciated that there is redundancy of information required to fully represent a full range of operations supported by a particular instruction set. In order for instructions to be differentiable from each other in a typical processor ISA, there needs to be an opcode identifier (or more generally, some portion of opcode space) that can be allocated to the instruction or instructions. If the processor ISA is new, then all the instructions that are desired to be supported can simply be allocated opcode identifiers. However, some processor architecture families have been in existence for a comparatively long time. For example, the MIPS® processor Instruction Set Architecture (ISA) was introduced in 1981 and over the ensuing years there have been a variety of changes and additions to the MIPS ISA. One way to add an instruction to an existing processor ISA would be to reassign an opcode identifier for an existing instruction to the new instruction. However, such an approach would cause binaries compiled for the prior version of the ISA to be incompatible with the new version, since the processor would attempt to execute a different instruction than what was intended by the binary. Applicant desires to reduce or avoid these kinds of incompatibilities, but also desires to be able to add new instructions to an existing ISA. Applicant also desires to be able to have a larger total opcode space represented by the same number of bits, and to be able to reduce a number of bits allocated to opcode identification, in order to uniquely identify a given number of operations. Implementations of the following disclosure can achieve one or more of these capabilities; however, there is no specific requirement that an implementation of the disclosure achieve these objectives, or its creation be motivated by such objectives. These capabilities are exemplary, but not exhaustive of the advantages that can be achieved by implementing the disclosure, and no requirement is implied that subject matter within the scope of any claim is required to have any one or more of these advantages.

Figure 3:
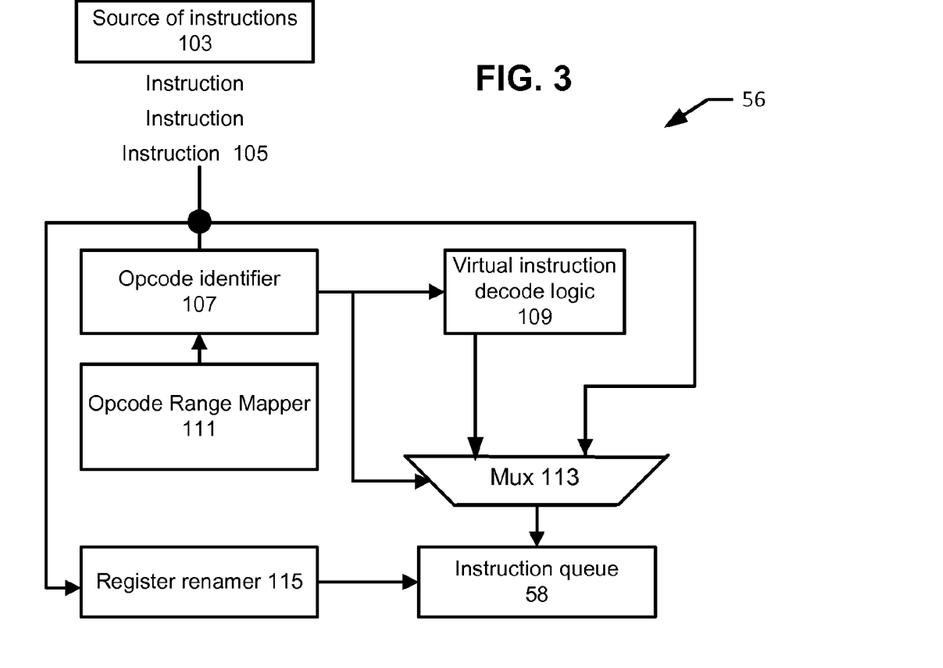
FIG. 3 depicts an example block diagram of an instruction decoder that can implement aspects of the disclosure.

FIG. 3 depicts functional elements of an example implementation of decode and rename unit 56. A source of instructions 103 presents a series of instructions (instruction 105 is specifically identified) to an opcode identifier 107. Opcode identifier 107 couples with opcode range mapper 111 and with virtual instruction decode logic 109. Opcode identifier 107 uses data from opcode range mapper 111 to perform an initial decoding of instruction 105. In an implementation, opcode range mapper 111 contains mapping data that identifies a subset of instructions that are to be provided to virtual instruction decode logic 109 and others that do not need to be processed by virtual instruction decode logic 109 in order to be used in processor 50. Opcode identifier 107 and opcode range mapper 111 can be implemented as a Content Associative Memory (CAM) lookup, for example. Another implementation of opcode identifier 107 may be a combinatorial circuit that implements the logic required to decode the opcode identifiers of the instruction set, or to differentiate between virtually encoded instructions and literal instructions, if these are to be decoded by separate circuits.

A multiplexer 113 can be controlled by an output of opcode identifier 107 in order to select from an output produced by virtual instruction decode logic 109 or the instruction 105. An input of an instruction queue 58 couples to receive an output of multiplexer 113. Instruction queue 58 also receives inputs from register renamer 115. Register renamer 115 produces a mapping between architectural registers and physical registers. The physical registers that will be used for a particular instruction are correlated with the architectural registers identified in that instruction; an exact approach to maintain such correlation is implementation specific. An output of instruction queue 58 thus can be viewed as containing information that will be used to configure execution elements of processor 50 in order to perform the instruction (e.g., instruction 105). In the example of FIG. 1A, the instruction queue 58 is coupled with ROB 62. ROB 62 is used to monitor speculative execution results from out of order execution pipeline(s) 70. Even though instructions may be executed speculatively within a speculation window supported by ROB 62, ROB 62 may enforce in-order retirement or commitment of results.

Figure 4:
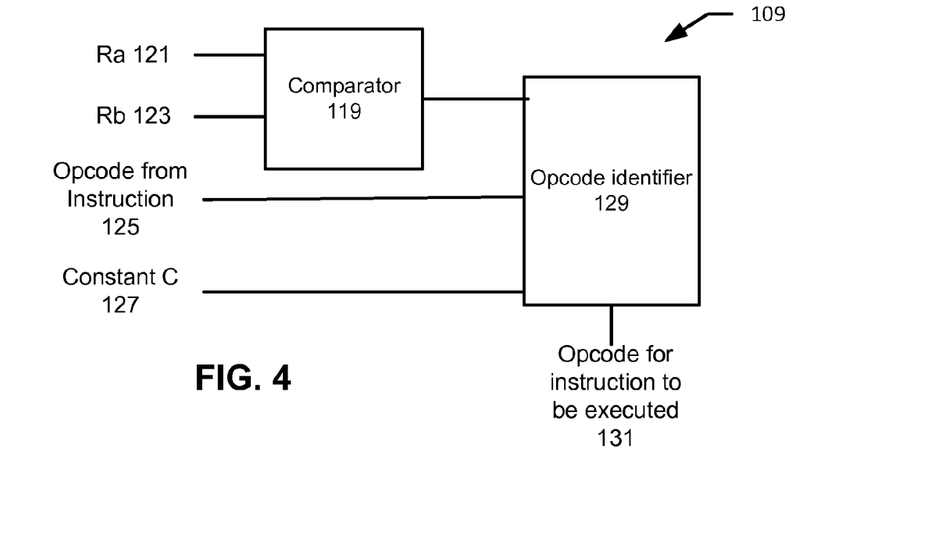
FIG. 4 depicts an example of an instruction decoder that can implement aspects of the disclosure.

FIG. 4 depicts an example of virtual instruction decode logic 109. In the example of FIG. 4, decode logic 109 includes a comparator 119, which inputs source operand Ra 121 and source operand Rb 123. The example of FIG. 4 is specific to the BEQ instruction introduced in FIG. 2, and the specific inputs to comparator 119 may vary depending on the particular instruction being decoded. An output of comparator 119 is provided to an opcode identifier circuit 129. Opcode identifier circuit 129 also has an input 125 for an opcode from the instruction being decoded (e.g., instruction 105). In FIG. 4, input 125 may be implemented to include enough bits from the instruction being decoded to uniquely map the instruction to an operation that will be performed by the processor. In particular, some virtually encoded instructions may have a function code. This function code may be a "don't care" for the opcode identifier circuit, and such function code may or may not be inputted to it. Opcode identifier circuit 129 also may have an input 127 for constant C (see FIG. 2), in dependence on whether the constant C is required to fully determine an operation to be performed for a given instruction (of course, constant C could be provided even if it is "don't care" input, but this would be an implementation choice). Opcode identifier circuit 129 outputs an opcode data 131 that can then be used to configure a portion of logic to execute an operation. The portion of logic can be a functional unit, for example. While it is possible that opcode data 131 could be used for a microcode lookup or some other more complex operation, such a microcode lookup may increase execution time or a number of pipeline stages required for the instruction, or introduce variation in a number of pipeline stages required to execute different instructions.

Figure 5:
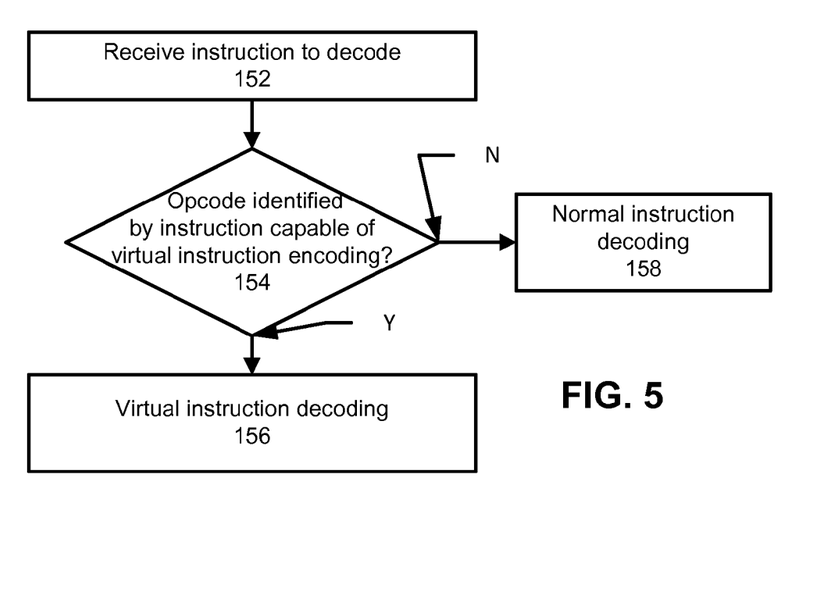
FIG. 5 depicts a process of determining whether a given instruction is to be decoded according to a literal or to a virtual decoding process.

Example processes performed to decode a virtually encoded instruction are provided below. FIG. 5 depicts an example process implemented by opcode identifier 107. At 152, an instruction is received to be decoded. At 154, a decision is made whether or not the instruction is capable of virtual instruction encoding. If the instruction is capable of virtual instruction encoding, then a virtual instruction decoding process 156 is invoked, and otherwise, normal instruction decoding 158 is invoked. Normal instruction decoding 158 may involve using only the binary elements supplied in the instruction and not metadata about those elements. As used here, metadata means data about the elements of an instruction, such what registers are identified, what relative order register numbers are presented, or some other combination or inter-relationship between or among the elements in an instruction that conforms to a pre-determined interpretation convention. In some implementations, a processor can be viewed as decoding an element of machine code, which can be, for example, 32 bits of data that are fetched from a memory address aligned to a 32 bit boundary and would be encoded to represent elements of an instruction to be executed by the processor according to a pre-defined specification.

It is contemplated that implementations may have only a subset of instructions that will be encoded virtually. Virtual decode logic could be provided that receives all instruction data and is configured to pass through literally encoded instructions. Thus, the decision at 154 does not imply that decoder 56 needs to have separate decode logic for literal and virtually encoded instructions. For example, virtual decode logic and logic for decoding regular instructions can be implemented together, and such logic in turn can be implemented with logic for other functions.

Figure 6:
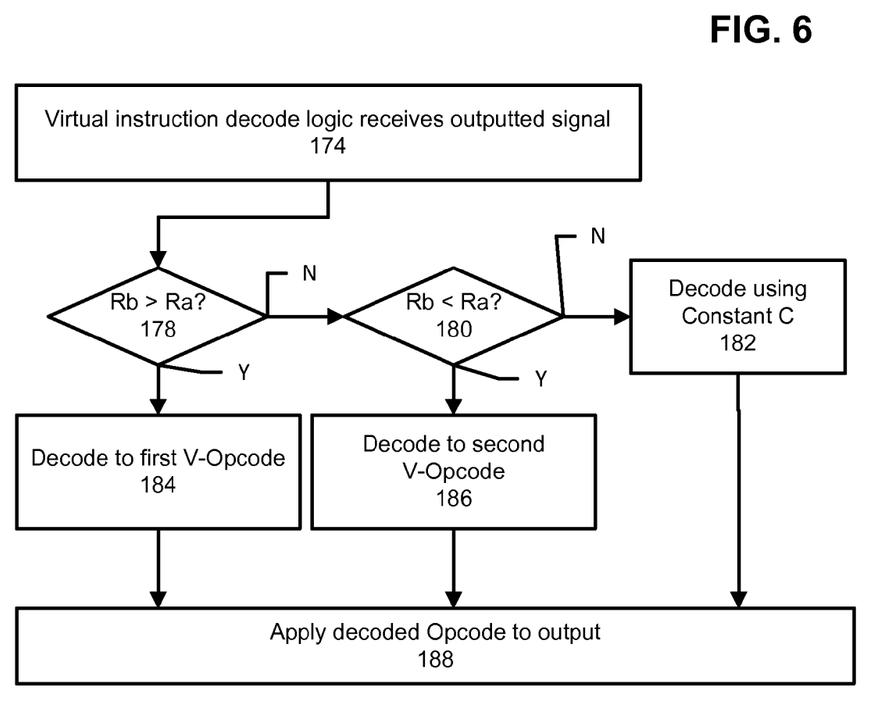
FIG. 6 depicts a process of decoding an example virtually encoded instruction.

An example of a virtual instruction decoding process is presented in FIG. 6; this example is specific to instructions that use two source registers, such as the BEQ instruction depicted in FIG. 2. However, the disclosures can be adapted or extended for other instructions. At 174, decode logic receives data for the instruction to be virtually decoded. At 178, a determination is made as to whether Rb is greater than Ra; this determination is not a determination involving the values in these registers but rather the numbers of the registers themselves. If Rb is greater than Ra, then at 184, the instruction is decoded to a first virtual opcode. If Rb is not greater than Ra, then at 180 a decision can be made whether Rb is less than Ra. If so, then the instruction can be decoded to a second virtual opcode. If this condition fails, then at 182 the instruction can be decoded using the Constant C, as explained further below. In any case, one of these conditions will be true, and the resulting decoding of the instruction will be applied, at 188, to an output. It would be appreciated that the example process of FIG. 6 can be refactored while maintaining logical equivalency, and all of these refactorings are within the scope of the disclosure. By way of example, decisions 178 and 180 can be reversed, a determination of equality can be made between the source registers, the decoding of the instruction can proceed in parallel for all possibilities and the determinations 178 and 180 can be used to make a selection of the resulting decodings. Some implementations may not use Constant C for decoding, and in such implementations, either decision 178 or 180 is unnecessary, and the decoding to either the first virtual opcode or the second can be made based on a comparison whether source Ra is greater or less than source Rb. Implementations may select a convention to use (e.g., whether Ra is greater than Rb or whether Ra is less than Rb; these are equivalent to whether Rb is less than Ra or whether Rb is greater than Ra).

These specific examples can be understood as disclosing that a given single instruction that identifies two source registers can be decoded into two different instructions based on a relative value of the source registers, and optionally that if these registers are equal, then the decoding can be performed using a Constant C. FIGS. 7 and 9-12 present a more-specific example of virtual instruction decoding within the scope of the disclosure. In these various examples of decode logic, it would be understood that the examples are presented to be readily understood by humans, but actual machine structures (e.g. realized synthesized logic) representing or containing a decode process according to the disclosure may differ significantly from the textual explanation. The disclosure presents examples of using identifiers for source registers as metadata for use in instruction decoding. The identifiers in some implementations can be sequences of binary digits of a length appropriate to differentiate registers from each other. In one implementation, instructions identify architectural registers, which may be fewer in number than a number of physical registers. Implementations may provide metadata used in decoding may be architectural register identifiers, or may be physical register identifiers (after an architectural to physical register mapping). These examples can be generalized to other types of metadata, such as metadata that identifies elements of an ordered set. Where 3 or more registers are identified, further instruction encodings can be possible, such as by using pre-defined sequences of ordering of the three or more register identifiers, for example.

Figure 7:
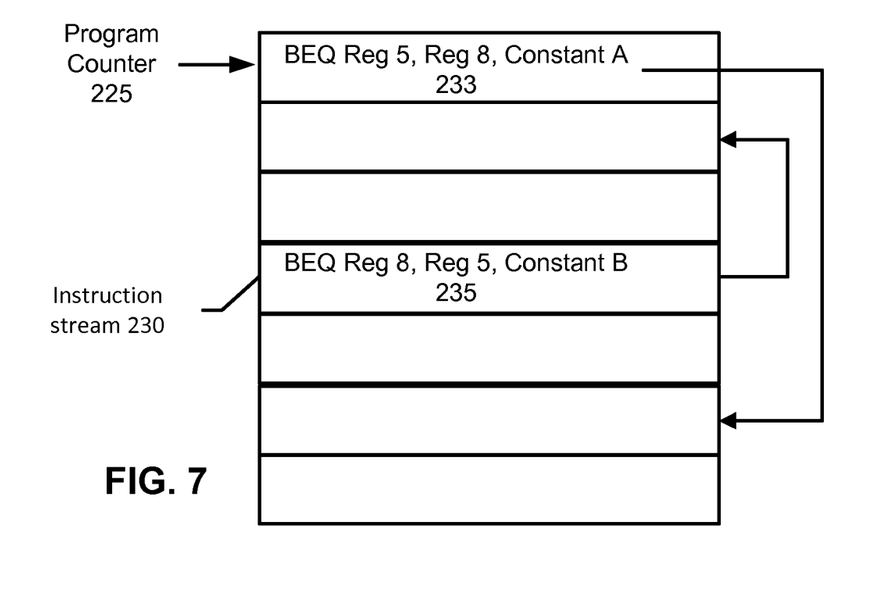
FIG. 7 depicts an example instruction stream.

FIG. 7 depicts a stream of instructions, with PC 225 indexing a BEQ instruction 233 that identifies Register 5 and Register 8 as source operands, in that order, with a Constant A. The stream of instructions also includes a second BEQ instruction 235, which identifies Register 8 and Register 5 as source operands, with a Constant B. A conventional decoding of instruction 233 and 235 would decode both of these instructions to the same instruction (save a potential difference in the value of the constant, which controls the branch target). In other words, for a conventional decoding, the order of presentation of the same source operands is irrelevant. An example of such behavior is shown in FIG. 8, which was described above.

Figure 9:
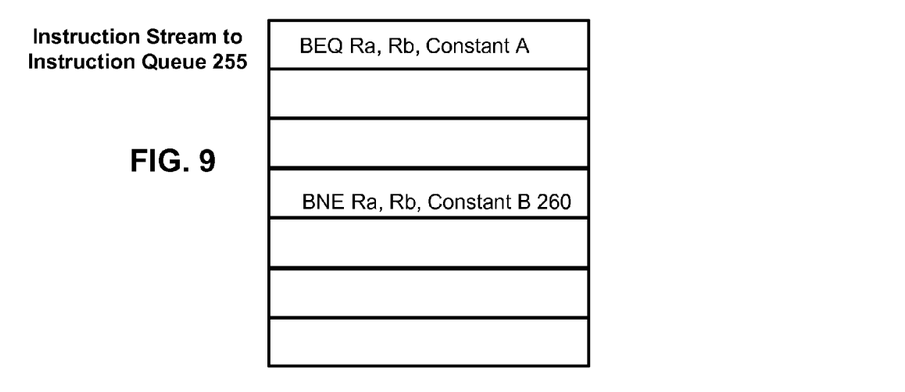
FIG. 9 depicts an example instruction stream produced by literal and virtual decoding of instructions.

FIG. 9 depicts an instruction stream 255 that results from a virtualized decoding of instructions 233 and 235. Instruction stream 255 shows that the second instruction has been interpreted as a Branch Not Equal (BNE) instruction 260, even though the data of the instruction "literally" invokes a BEQ. It was explained above that instructions provided to processor 50 follow are in accordance with a particular ISA. However, an internal representation of the operation that will actually be performed by the processor does not have to conform to the bit-wise format specified by the ISA. For example, there is not necessarily a requirement that the internal representation of an instruction be the same number of bits as the external representation.

Here, where a given "literal" instruction may virtually encode multiple different instructions, an internal representation of a virtually encoded instruction may have additional bits. The example of allowing a BEQ to encode both a BEQ and a BNE instruction is for sake of a simple explanation. Such an encoding may have a primary use in an ISA that did not provide BNE as a literally-encoded instruction. However, some implementations may support the same instruction, both as a literal encoding and as a virtual encoding, as a migration strategy which allows both legacy code with a literal encoding and new code that was generated to include the virtual encoding. Over time, the new code will become legacy code and the old ISA with the literally encoded instruction can be deprecated. In other implementations, the same main instruction may be supported with multiple format options. For example, a literally encoded BNE may cause the branch to be taken relative to a location determined based on the specified Constant relative to a base address of the code segment being executed, and the virtually-encoded instruction may cause the branch to be taken to a location specified by the Constant relative to the current Program Counter. Variations of these examples are possible (e.g., shifting the Program Counter by some number of bits before calculating a target address). Another example category of instructions that can be provided are compact branch instructions. A compact branch instruction does not have a delay slot. Another category includes instructions that can have different behavior on detection of certain conditions, such as overflow, underflow, or exceptions. Other potential instruction encodings are described below. For example, function codes can specify different options, such as a branch relative to program counter or relative to an offset, branch on overflow, branch with exception, and so on.

Figure 10:
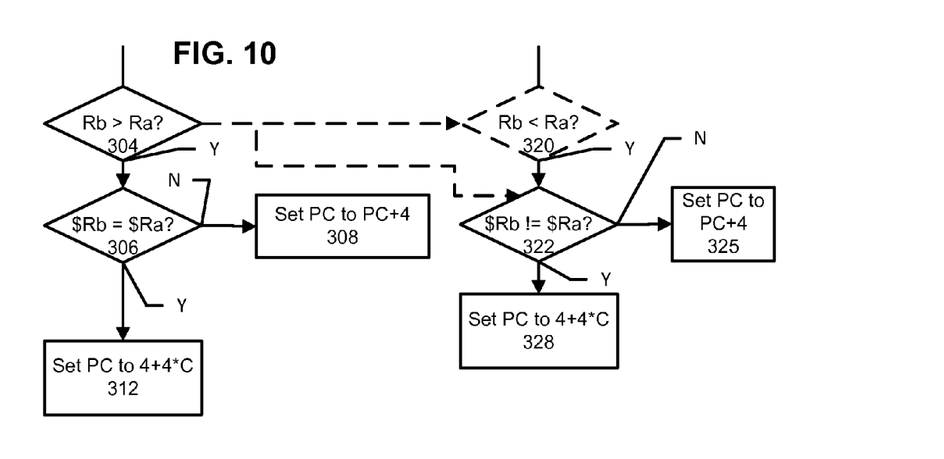
FIG. 10 depicts actions taken in order to decode and process a virtually encoded BEQ instruction.
Figure 11:
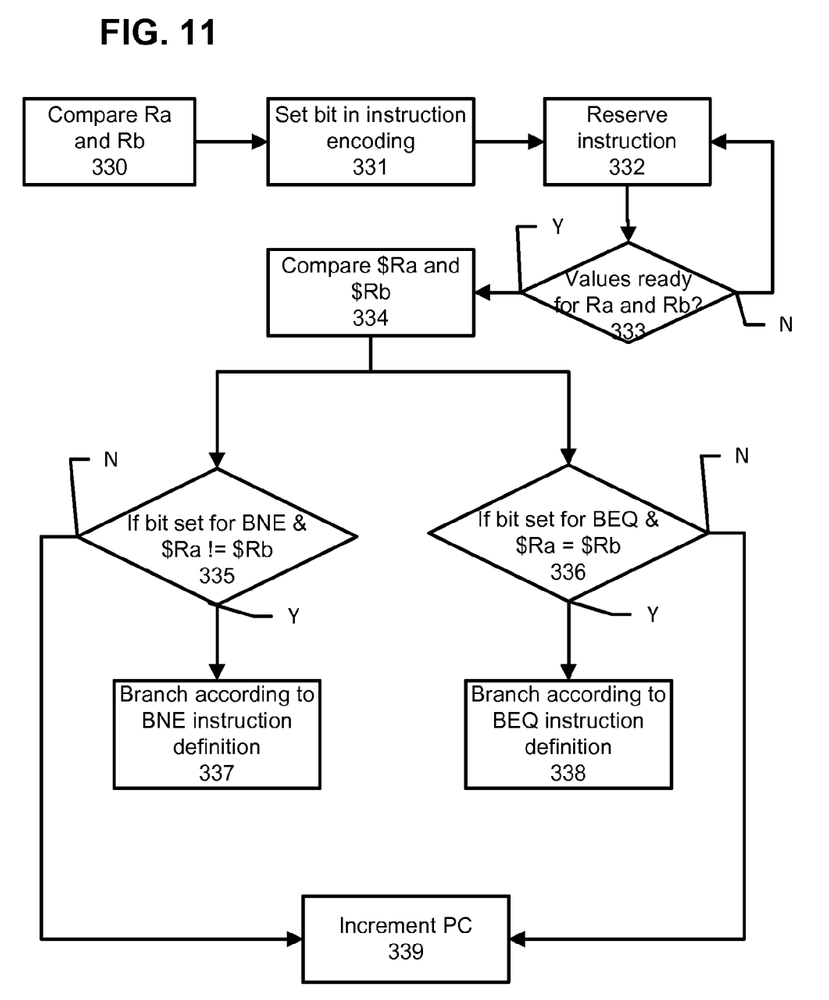
FIG. 11 depicts an alternative example implementation of decoding and processing a virtually encoded BEQ instruction.

FIG. 10 and FIG. 11 depict how the same literally encoded instruction can be processed to encode two different execution options; these examples show how the processor as a whole would treat the literally encoded instruction provided to it. FIG. 10 depicts that a determination 304 of Rb being greater than Ra causes the values in Rb and Ra to be compared with each other at 306. If the values are not equal, then the branch is not taken, and the PC is simply incremented at 308. If the values are equal, then the PC is set based on the specified constant at 312 (normal BEQ behavior). FIG. 10 also depicts that optionally, it can be determined whether Rb is less than Ra, at 320, and if so, then a determination whether the values in each of Rb and Ra are not equal is performed at 322 (or determination 304 can go directly to determination 322 instead of 320). An outcome of determination 322 controls whether the branch is taken or not. The branch is taken if the values in Rb and Ra are not equal (going to action 328) and is not taken otherwise (action 325).

An equivalent implementation would be to perform the action 304 and encode a result of this action as an extra bit of state that follows the instruction. Then, the outcome of the action 306 (the comparison of the values in the source registers) is interpreted in light of the encoded result of the determination at 304. In such an approach, the determination 322 is unnecessary, as it is the inverse of action 306.

FIG. 11 depicts an implementation according to such an approach to implementing the virtually-encoded BEQ/BNE example above. In FIG. 11, Ra and Rb are compared at 330. This comparison can occur during instruction decode. At 331, a bit is according to an outcome of the comparison of Ra and Rb (the bit is set to a value based on whether Ra is equal to Rb or not). At 332, if architecturally visible values for Ra and Rb are not available, then the instruction is reserved from execution (in this example). At 333, if the values of Ra and Rb become available, then those values are compared at 334; otherwise the instruction continues to be reserved at 332. At 335, if the bit is set to a value that is interpreted as indicating BNE (this can be a matter of convention) and if the values of Ra and Rb are not equal, then at 337, the branch is according to the BNE instruction definition. At 338, if the bit is set to a value that is interpreted as indicating BEQ and if the values of Ra and Rb are equal, then at 336, the branch is according to the BEQ instruction definition. Otherwise, at 339, the PC is incremented.

The example of FIG. 11 shows that the information to fully decode the instruction is available to the decode unit, even though the final values of Ra and Rb may not yet be committed, and data can be created that defines what actions are to be taken at a later point in the pipeline of the processor. The decisions depicted in 335 and 336 can be refactored. For example, the contents of the registers can be compared and then a determination whether BNE or BEQ behavior is indicated can be made, and a program counter set accordingly. These are example microarchitectural implementation choices that a person of ordinary skill may make in a particular design circumstance.

Figure 12:
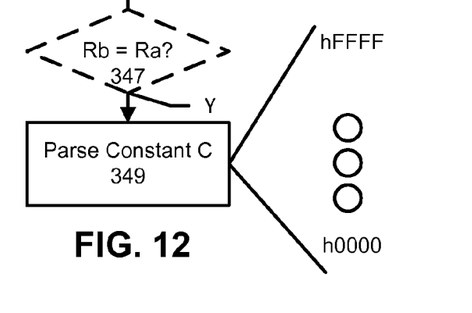
FIGS. 12 and 13 depict aspects of virtual instruction decoding using a constant included with the virtually encoded instruction.
Figure 13:
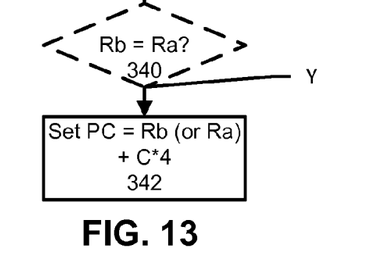

FIGS. 12 and 13 depict examples of virtual instruction set architectures that also encode instruction set information within a constant value of the literal data for a given instruction, again using an approach appropriate for a BNE or BEQ instruction. In FIG. 12, at 347, a decision occurs whether both of the source registers are the same. For an ordinary BNE or BEQ instruction, if both source registers are the same, the branch will never be taken or always taken. Thus, in appropriate circumstances, a BNE or BEQ instruction can be generated that includes the same source register in both source operands. This circumstance can be interpreted by instruction decode to indicate that the constant is to be used to determine, at 349, what operation to be executed. The constant is 16 bits in this example, and therefore can encode a great deal of information. FIG. 13 shows another example, wherein such determination 340 is an indication of an always taken branch, where the branch target is calculated using the contents of the source register, and the constant to calculate a next PC. Having an extra 32 bits (in the example of 32 bit registers) allows a much wider range of jumps to occur than if only the 16 bits of offset can be used.

Figure 14:
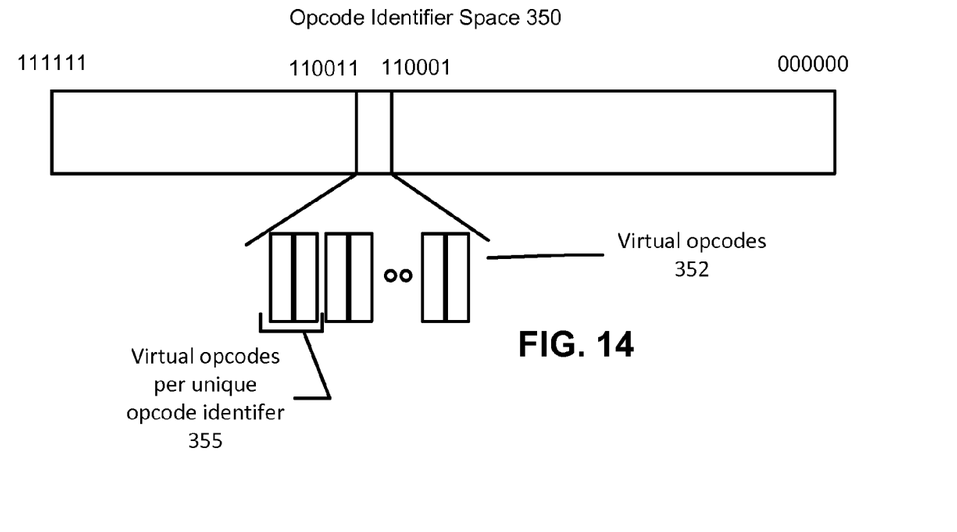
FIGS. 14 and 15 depict diagrams of how use of virtually encoded instructions can increase an available opcode identifier space in an instruction set architecture.
Figure 15:
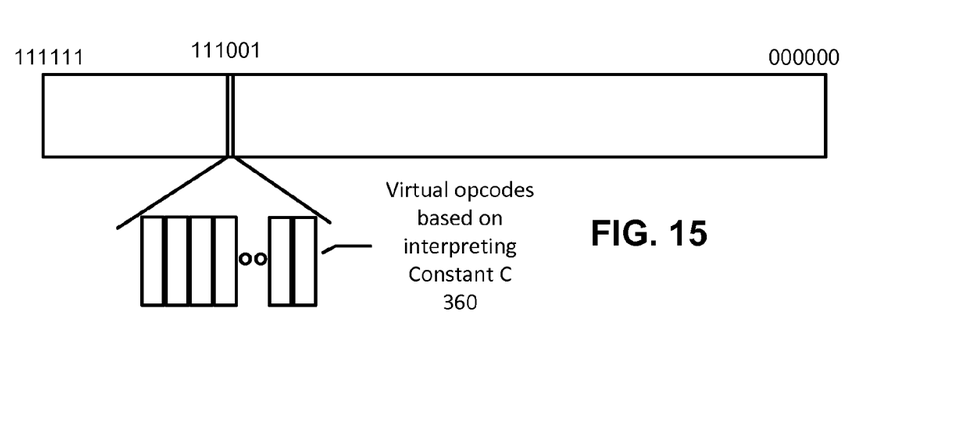

FIG. 14 depicts a conceptual view of how virtual opcodes can be located within a literal opcode identifier space 350. According to FIG. 14, there is unused opcode space between 110011 and 110001 binary (since this example assumes that there are no main opcodes in this space, function codes do not need to be considered). Within this space, a set of virtual opcodes 352 can be provided. The example of FIG. 14 shows that a pair 355 of virtual opcodes are available for each unique opcode identifier. This is the case in the example where a relative order of two source registers numbers is considered, but not a value of a constant, for example. FIG. 15 depicts that a larger number of virtual opcodes 360 are available within a single literal opcode identifier, when also using a constant value supplied with an instruction, as in FIG. 12. More generally, it can be considered that instructions may reference elements from pre-determined sets of elements that have an inherent ordering. By applying a convention that constrains the generalized case, additional opcode identifier space is realized.

A processor can be designed with a decode unit that implements these disclosures. However, the processor still would operate under configuration by code generated from an external source (e.g., a compiler, an assembler, or an interpreter). Such code generation can include transforming source code in a high level programming language into object code (e.g., an executable binary or a library that can be dynamically linked), or producing assembly language output, which could be edited, and ultimately transformed into object code. Other situations may involve transforming source code into an intermediate code format (e.g., a "byte code" format) that can be translated or interpreted, such as by a Just In Time (JIT) process, such as in the context of a Java® virtual machine. Any such example code generation aspect can be used in an implementation of the disclosure. Additionally, these examples can be used by those of ordinary skill in the art to understand how to apply these examples to different circumstances.

Figure 16:
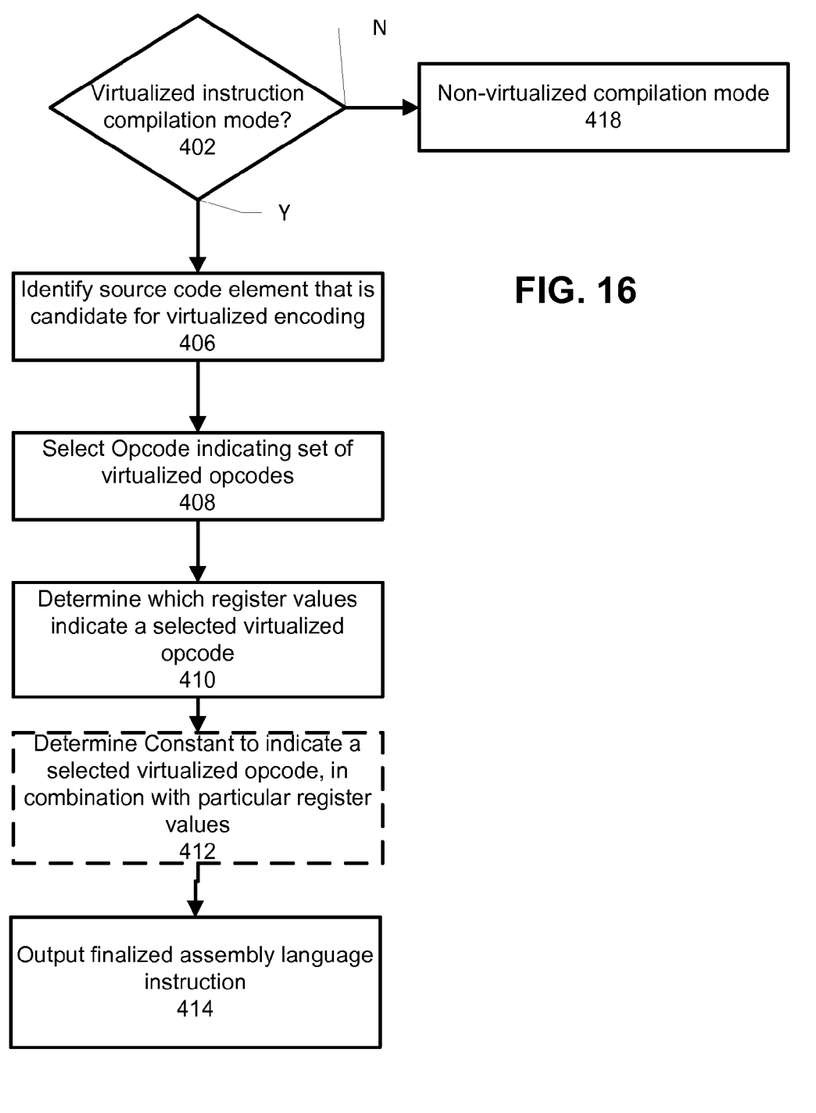
FIG. 16 depicts a process of compiling source code for a processor architecture that implements virtualized instruction decoding.

FIG. 16 depicts an example of a process by which a compiler can produce machine executable code that has characteristics according to the disclosure. At 402, a determination whether a current code generation mode is to produce virtualized instructions or not is made. If not, then at 418, typical non-virtualized machine code can be produced for a given input (e.g., a high level source code module or a portion of assembly language code). If to produce virtualized instructions, then at 406, a source code element from the input is identified as a candidate for virtualized encoding. At 408, an opcode indicating a particular set of virtualized opcodes is selected. Such selection can be based on what operation(s) the source code element is performing. If the source code element is in a high-level language, then that element may be decomposed into several machine language elements, each of which could be a candidate for a virtualized instruction encoding. A compiler has a variety of options concerning how to produce object code from a source code input, and providing more available instructions, through the possibility of using virtualized opcodes, would increase these options. Compilers can rely on a variety of heuristics and other analytical approaches to determining a code sequence. Compilers must observe limitations imposed by the architecture for which the compiler is generating output.

At 410, in order to fully specify a given virtualized opcode, an appropriate relative ordering of source registers is required (in an example). Therefore, at 410, these source register values are determined. During execution, these source registers can be renamed to appropriate physical registers, but the compiler still should attempt to avoid false dependencies. At 412, if a constant is also being used to encode a virtualized opcode, then that constant is determined. Otherwise, the constant can be determined based on other considerations, such as the location of a branch target, relative to either to a base address or to the PC, for example. At 414, a finalized assembly language instruction can be outputted; in other examples, byte code or binary code can be outputted.

Figure 17:
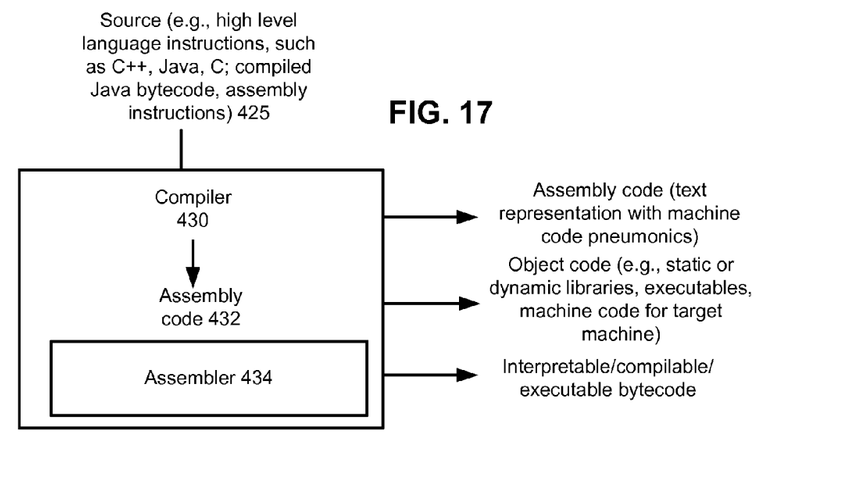
FIG. 17 depicts a block diagram of a compiler that can produce assembly code, object code and code, such as bytecode that can be interpreted or compiled in a VM.

FIG. 17 depicts a diagram in which a compiler 430 includes an assembler 434. As an option, compiler 430 can generate assembly code 432 according to the disclosure. This assembly code could be outputted. Such assembly code may be in a text representation that includes pneumonics for the various instructions, as well as for the operands and other information used for the instruction. These pneumonics can be chosen so that the actual operation that will be executed for each assembly code element is represented by the pneumonic. In other words, even though underlying binary opcode identifiers within a binary code may be the same, when representing that binary code in text assembly language, the pneumonics selected would be selected also based on the other elements of each assembly language element, such as relative register ordering, that affect what operation will be performed by the processor and not simply a literal translation of the binary opcode identifier. FIG. 17 also depicts that compiler can output object code, and bytecode, which can be interpretable, compilable or executable on a particular architecture. Here, "bytecode" is used to identify any form of intermediate machine readable format, which in many cases is not targeted directly to a physical processor architecture, but to an architecture of a virtual machine, which ultimately performs such execution. A physical processor architecture can be designed to execute any such intermediate machine readable format and the term "bytecode" is used for its simplicity, rather than by way of restriction.

Figure 18:
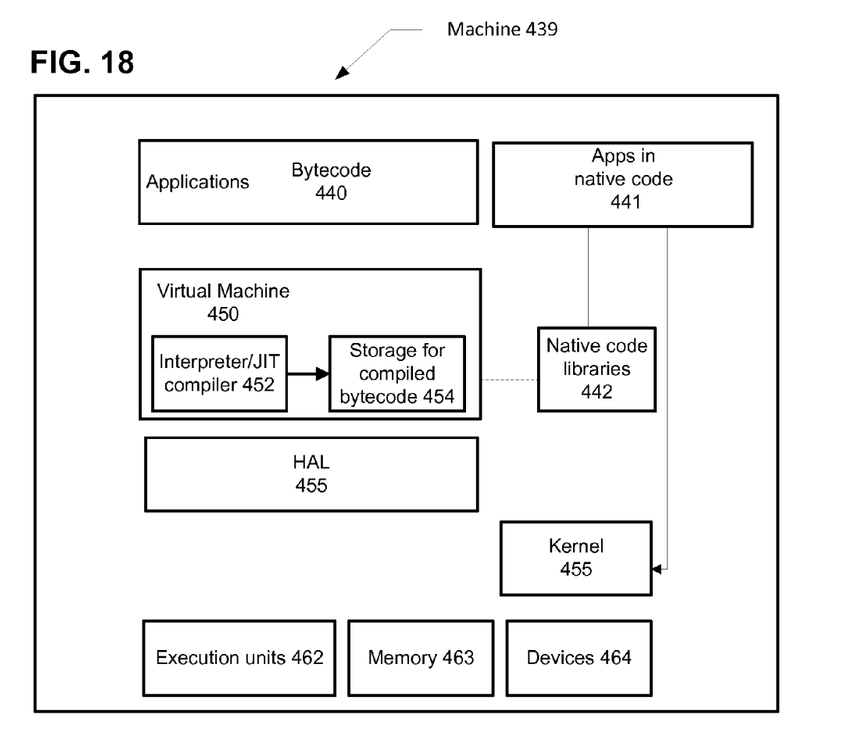
FIG. 18 depicts a software-oriented block diagram of a machine that implements a virtual machine that can execute bytecode, as well as executing applications in native code, and other code, on execution units.

FIG. 18 depicts a block diagram of an example machine 439 in which aspects of the disclosure may be employed. A set of applications are available to be executed on machine 439. These applications are encoded in bytecode 440. Applications also can be represented in native machine code; these applications are represented by applications 441. Applications encoded in bytecode are executed within virtual machine 450. Virtual machine 450 can include an interpreter and/or a Just In Time (JIT) compiler 452. Virtual machine 450 may maintain a store 454 of compiled bytecode, which can be reused for application execution. Virtual machine 450 may use libraries from native code libraries 442. These libraries are object code libraries that are compiled for physical execution units 462. A Hardware Abstraction Layer 455 provides abstracted interfaces to various different hardware elements, collectively identified as devices 464. HAL 455 can be executed in user mode. Machine 439 also executes an operating system kernel 455.

Devices 464 may include IO devices and sensors, which are to be made available for use by applications. For example, HAL 455 may provide an interface for a Global Positioning System, a compass, a gyroscope, an accelerometer, temperature sensors, network, short range communication resources, such as Bluetooth or Near Field Communication, an RFID subsystem, a camera, and so on.

Machine 439 has a set of execution units 462 which consume machine code which configures the execution units 462 to perform computation. Such machine code thus executes in order to execute applications originating as bytecode, as native code libraries, as object code from user applications, and code for kernel 455. Any of these different components of machine 439 can be implemented using the virtualized instruction encoding disclosures herein.

Figure 19:
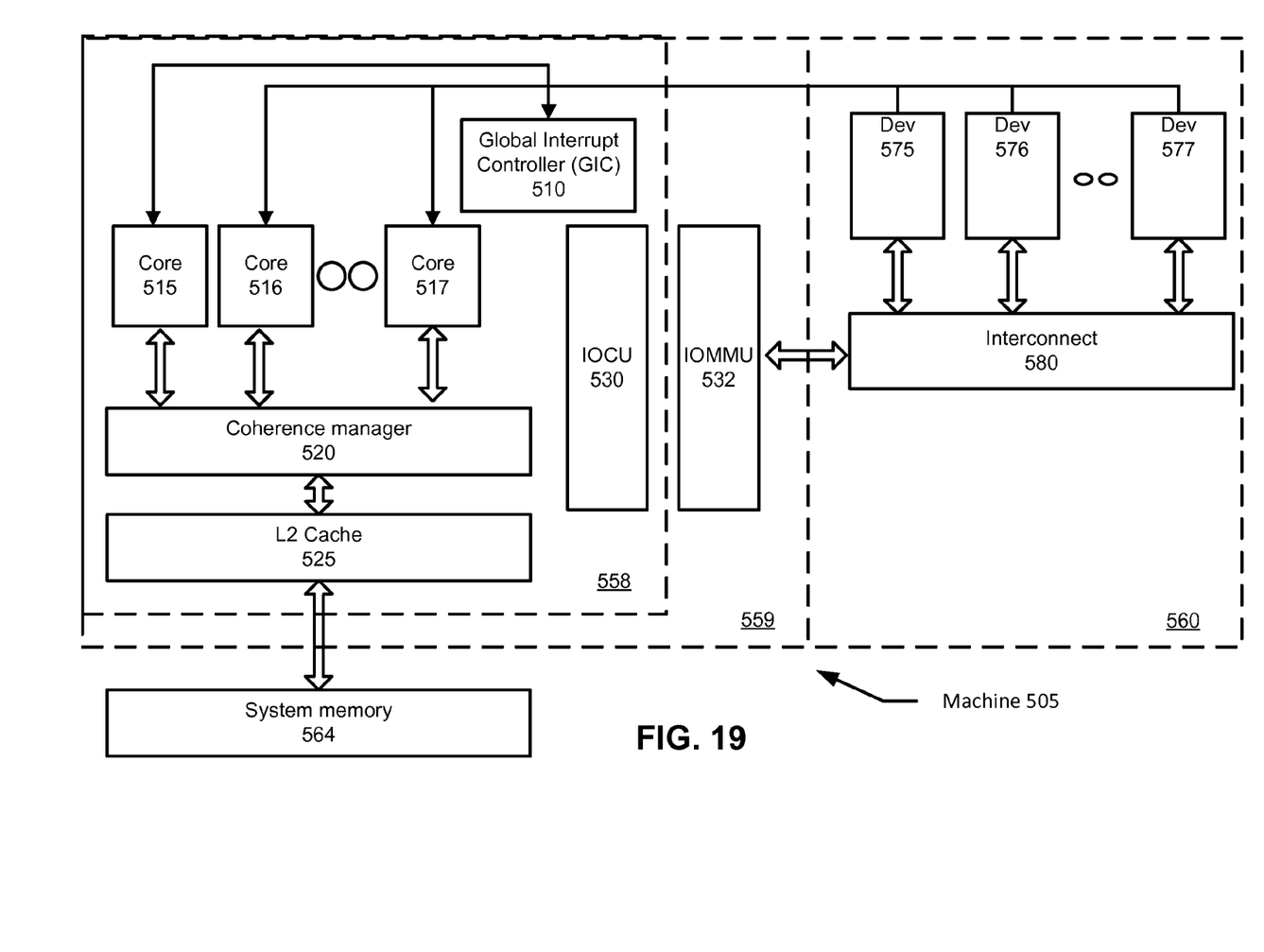
FIG. 19 depicts a block diagram of an example hardware-oriented block diagram of a machine that can implement aspects of the disclosure.

FIG. 19 depicts an example of a machine 505 that implements execution elements and other aspects disclosed herein. FIG. 19 depicts that different implementations of machine 505 can have different levels of integration. In one example, a single semiconductor element can implement a processor module 558, which includes cores 515-517, a coherence manager 520 that interfaces cores 515-517 with an L2 cache 525, an I/O controller unit 530 and an interrupt controller 510. A system memory 564 interfaces with L2 cache 525. Coherence manager 520 can include a memory management unit and operates to manage data coherency among data that is being operated on by cores 515-517. Cores may also have access to L1 caches that are not separately depicted. In another implementation, an IO Memory Management Unit (IOMMU) 532 is provided. IOMMU 532 may be provided on the same semiconductor element as the processor module 558, denoted as module 559. Module 559 also may interface with IO devices 575-577 through an interconnect 580. A collection of processor module 558, which is included in module 559, interconnect 580, and IO devices 575-577 can be formed on one or more semiconductor elements. In the example machine 505 of FIG. 19, cores 515-517 may each support one or more threads of computation, and may be architected according to the disclosures herein.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. Actions presented in one order may be rearranged into a different order, assuming appropriate dependencies are observed. Implementations may delay some actions relative to others. Implementations may parallelize different instances of the same action on the same hardware. As such, implementations according to this disclosure are not limited to those that have a 1:1 correspondence to the examples depicted and/or described.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets and the like.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects.

Also, a number of examples have been illustrated and described in the preceding disclosure. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

I claim:

1. A decode unit for a processor, comprising:
an input for an element of machine code representing an instruction, wherein the element of machine code comprises identifying data for two or more elements, selected from an ordered set; and
circuitry configured to:
responsive to an opcode identifier portion of the element of machine code identifying a virtually-encoded instruction, use both the opcode identifier portion and at least part of a remaining portion of the element of machine code to decode the element of machine code into data defining an executable operation for execution on an execution unit coupled with the decode unit, wherein a relative order in which the identifying data for the two or more elements appears in the element of machine code is used to determine the operation to be executed.

2. The decode unit for a processor of claim 1, wherein the opcode identifier portion of the element of machine code comprises a portion identifying a type of operation and a portion defining functional parameters relevant for the type of operation.

3. The decode unit for a processor of claim 1, wherein the determination whether the opcode identifier identifies a virtually encoded instruction is performed by decoding the opcode identifier portion of data representing the element of machine code.

4. The decode unit for a processor of claim 1, wherein the two or more elements are registers.

5. A decode unit for a processor, comprising:
an input for an element of machine code representing an instruction, wherein the element of machine code comprises a pre-defined relative order of fields dedicated to at least a part of the opcode identifier portion, identifiers for two or more registers, and a constant, and
circuitry configured to:
responsive to an opcode identifier portion of the element of machine code identifying a virtually-encoded instruction, use both the opcode identifier portion and at least part of a remaining portion of the element of machine code to decode the element of machine code into data defining an executable operation for execution on an execution unit coupled with the decode unit, wherein
the circuitry is configured to decode the element of machine code into two different executable operations, in dependence on (i) whether a number associated with a first-appearing register in the pre-defined relative order of fields is larger or smaller than a number associated with a second-appearing register in the pre-defined relative order of fields, or (ii) whether a relative position of an identifier for one of the two or more registers is before or after a relative position of an identifier of another of the two or more registers, within an ordered set of possible identifiers.

6. The decode unit for a processor of claim 1, wherein the element of machine code comprises fields dedicated to the opcode identifier portion, two registers, and a constant, and the circuitry is configured to decode the element of machine code using a value of the constant, responsive to an identifier associated with one of the two registers being the same as an identifier number associated with the other of the two registers.

7. A processor, comprising:
an execution unit;
a register set coupled with the execution unit, the execution unit configured to receive operands from registers within the register set; and
an instruction decoder configured to translate a single element of machine code into a selected operation from a plurality of virtually-encoded operations, to be performed by the execution unit, responsive to the single element of machine code, using both an opcode identifier in the single element of machine code and metadata about the single element of machine code, wherein the metadata comprises information relating to a relative order in which two or more discrete elements appear in the single element of machine code.

8. The processor of claim 7, wherein the metadata comprises a relative order in which two or more discrete elements appear in the single element of machine code, compared with a relative order in which those two or more discrete elements appear in a canonical ordering of a set of elements.

9. The processor of claim 7, wherein the single element of machine code identifies respective numbers of two or more source registers and the metadata comprises determining a relative order in which those two or more source registers are identified.

10. The processor of claim 7, wherein the single element of machine code identifies respective numbers of two or more source registers and the metadata comprises determining whether both of the two or more source registers identify the same register number.

11. The processor of claim 7, wherein the instruction decoder is configured to decode the single element of machine code in dependence on whether a first register identified in the element of machine code is greater than or less than a second register identified in the element of machine code.

12. The processor of claim 7, wherein the single element of machine code specifies both a first register and a second register from a set of architecture registers.

13. The processor of claim 7, wherein the instruction decoder is configured to decode the single element of machine code into a branch instruction that is either conditional or unconditional, in dependence on portions of the element of machine code that specify each of a first register and a second register.

14. The processor of claim 7, wherein the instruction decoder is configured to decode the single element of machine code into a branch instruction and to further decode the branch instruction into a branch if equal or a branch if not equal, in dependence on portions of the element of machine code that specify each of a first register and a second register.

15. The processor of claim 7, wherein the instruction decoder is configured to decode the single element of machine code into an arithmetic instruction, to further decode the single element of machine code into an arithmetic instruction that either performs the arithmetic instruction and a further action on a specified condition arising from performing the arithmetic instruction or an instruction that performs the arithmetic instruction and ignores the specified condition.

16. A method of decoding machine code in a processor, comprising:
    receiving a element of machine code in a decode unit of the processor, and
    producing data indicating an operation to be executed by the processor, wherein the operation is from a set of virtually-encoded operations, wherein which operation is indicated by the produced data depends both on an opcode identifier in the single element of machine code and metadata about the single element of machine code, wherein the metadata comprises information relating to a relative order in which two or more discrete portions appear in the single element of machine code.

17. The method of decoding machine code in a processor of claim 16, wherein the opcode identifier portion in the element of machine code comprises a portion identifying a type of operation and a portion defining functional parameters relevant for the type of operation, and the producing data indicating the operation comprises using the portion identifying the type of operation to determine whether the single element of machine code indicates a virtually-encoded operation.

18. The method of decoding machine code in a processor of claim 16, wherein the element of machine code comprises identifying data for two or more elements, selected from an ordered set, and further comprising determining, using a relative order in which the identifying data for the two or more elements appears in the element of machine code, an operation to be executed in response to the element of machine code.

19. The method of decoding machine code in a processor of claim 16, wherein the element of machine code comprises a pre-defined relative order of fields dedicated to at least a part of the opcode identifier portion, two or more registers, and a constant, and further comprising decoding the element of machine code into two different executable operations, in dependence on whether a number associated with a first-appearing register is larger or smaller than a number associated with the second-appearing register.

20. The method of decoding machine code in a processor of claim 16, wherein the element of machine code comprises a pre-defined relative order of fields dedicated to at least a part of the opcode identifier portion, two or more registers, and a constant, and further comprising decoding the element of machine code into two different executable operations, in dependence on whether a relative position of an identifier for a one of the two or more registers is before or after a relative position of an identifier of another of the two or more registers, within an ordered set of possible identifiers.

21. The method of decoding machine code in a processor of claim 16, wherein the element of machine code comprises fields dedicated to the opcode identifier portion, two registers, and a constant, and further comprising decoding the element of machine code using a value of the constant, responsive to an identifier associated with one of the two registers being the same as an identifier number associated with the other of the two registers.

22. The decode unit for a processor of claim 1, wherein the circuitry is further configured to determine whether the opcode identifier portion of the element of machine code identifies a virtually encoded instruction, and wherein the circuit is further configured to, responsive to the opcode identifier portion not identifying a virtually-encoded instruction, decode the element of machine code into data defining an executable operation using the opcode identifier portion of the element of machine code.

* * * * *